(12) United States Patent
Chen et al.

(10) Patent No.: US 7,677,803 B2
(45) Date of Patent: Mar. 16, 2010

(54) QUICK RELEASE COUPLING DEVICE FOR A LINEAR GUIDEWAY

(75) Inventors: Hsin-Liang Chen, Taichung (TW); Jin-Sheng Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 1195 days.

(21) Appl. No.: 11/245,820

(22) Filed: Oct. 7, 2005

(65) Prior Publication Data
US 2007/0081853 A1 Apr. 12, 2007

(51) Int. Cl.
*F16C 29/06* (2006.01)
*F16C 33/10* (2006.01)
(52) U.S. Cl. .......................................... 384/43; 384/13
(58) Field of Classification Search ............. 384/43–45, 384/13; 403/348, 349; 411/349, 549, 553
See application file for complete search history.

(56) References Cited

U.S. PATENT DOCUMENTS

| | | | |
|---|---|---|---|
| 3,811,157 A * | 5/1974 | Schenk | 411/349 |
| 5,694,811 A * | 12/1997 | Tsukada | 74/467 |
| 6,988,517 B1 * | 1/2006 | Hsu et al. | 141/67 |

* cited by examiner

*Primary Examiner*—Thomas R Hannon
*Assistant Examiner*—Phillip Johnson
(74) *Attorney, Agent, or Firm*—Charles E. Baxley (57) ABSTRACT

A quick release coupling device for a linear guideway comprises a rail, a slide block, a pair of end caps and a pair of connectors. Each of the end caps has a through hole in which are annularly arranged a slant rotary abutment surface and a plurality of grooves. The connectors each has an end fixed to the slide block, and another end of the connectors is defined with a wing-shaped portion, the wing-shaped portion has an abutment surface for mating with the rotary abutment surface of the end caps.

6 Claims, 9 Drawing Sheets

QUICK RELEASE COUPLING DEVICE FOR A LINEAR GUIDEWAY

BACKGROUND OF THE INVENTION

1. Field of the Invention

The present invention relates to a quick release coupling device for a linearway, besides having screwing and positioning function, the quick release coupling device also can be used as an oil nozzle.

2. Description of the Prior Arts

Figure 1:
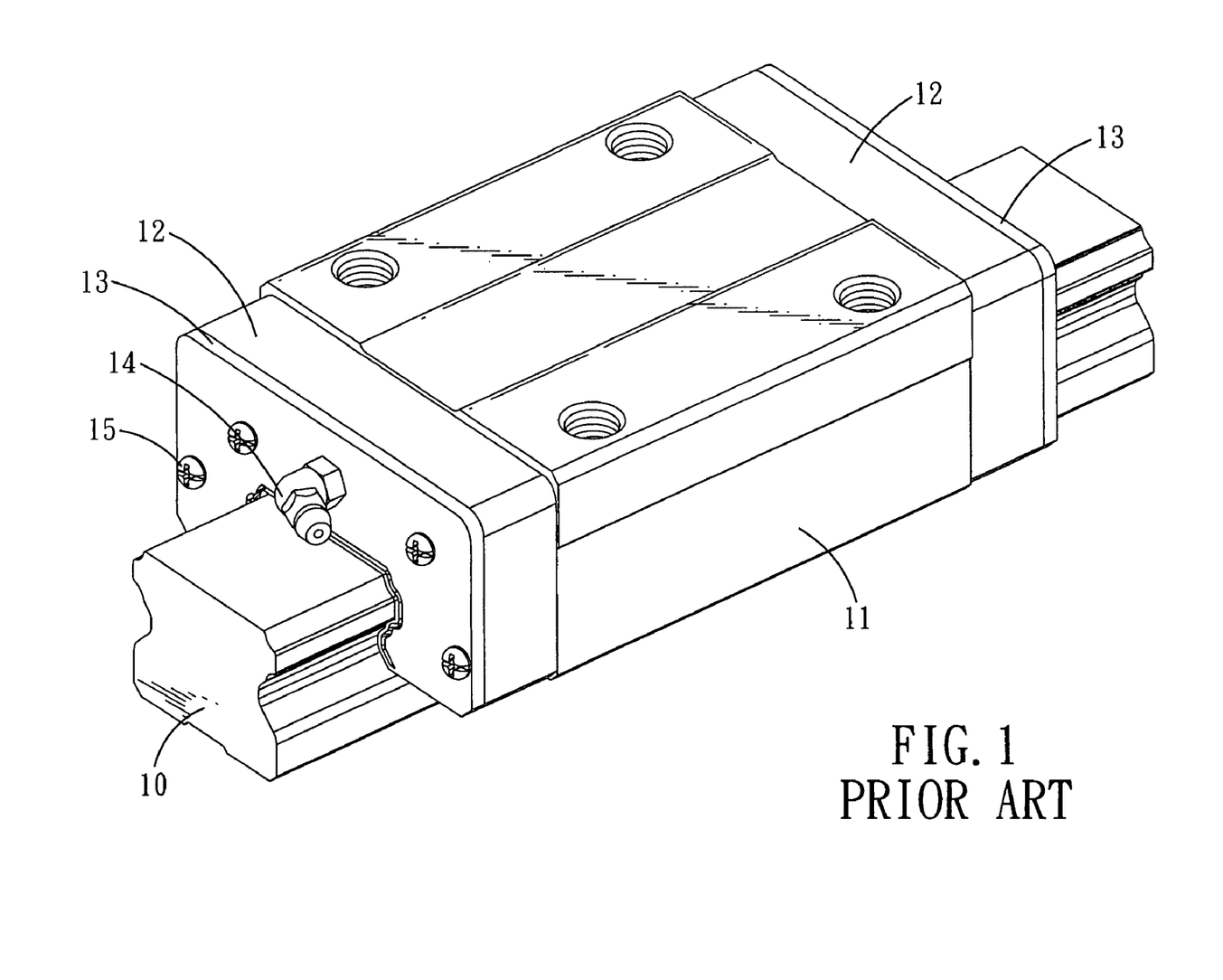
FIG. 1 is an assembly view of a conventional linear guideway.
Figure 2:
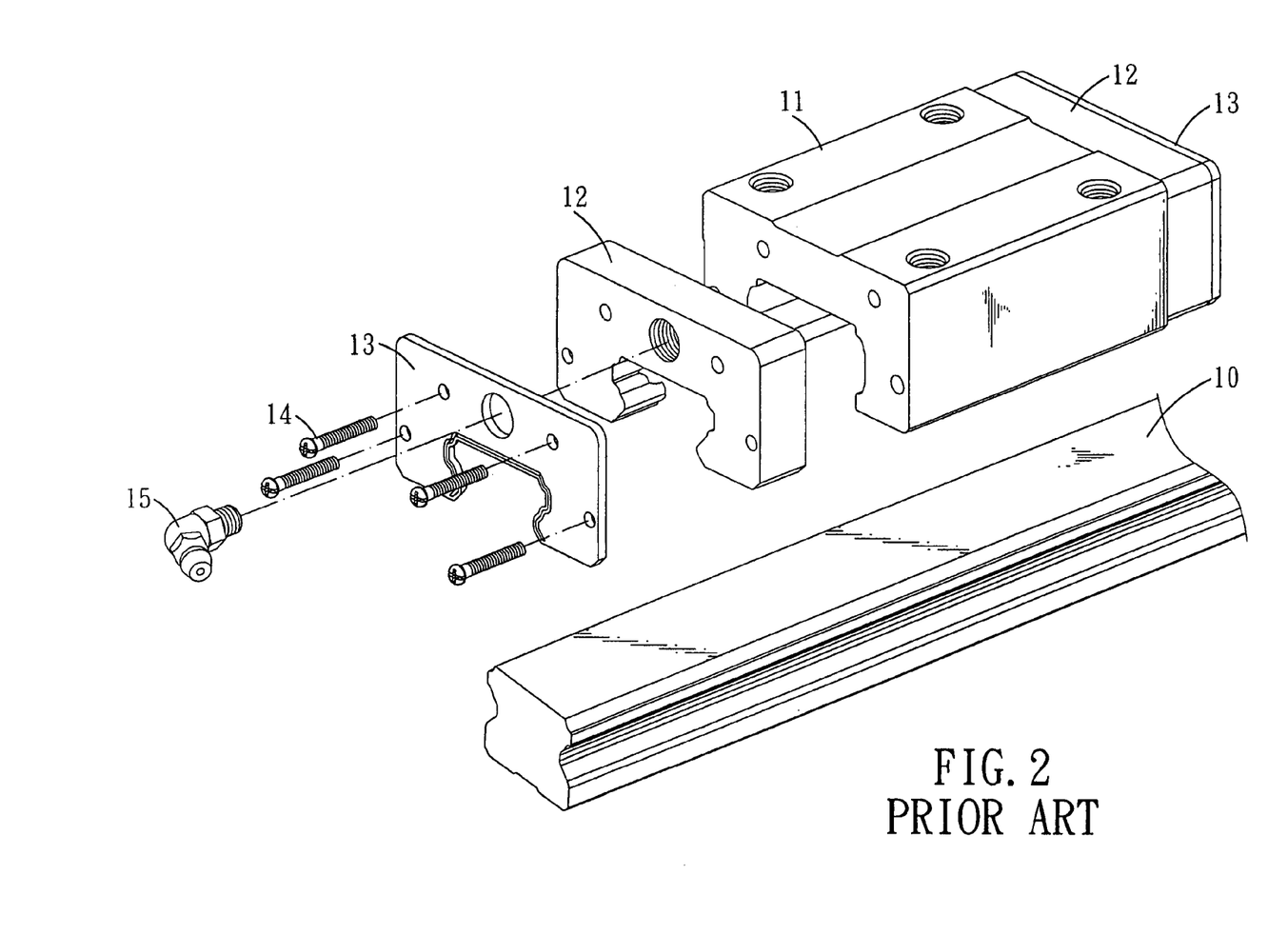
FIG. 2 is an exploded view of a conventional linear guideway.

Referring to FIGS. 1 and 2, a conventional linear guideway is shown and generally comprises a rail 10, a slide block 11, a pair of end caps 12 and a pair of sealing members 13. The slide block 11 is moveably mounted on the rail 10, and then the pair of end caps 12 and the pair of sealing members are attached to either side of the slide block 11, respectively, by means of a plurality of screws 14 and a nozzle tip 15. However, this conventional linear guideway still has some defects that could be improved:

First, the end caps 12, the sealing members 13 and the slide block 11 are assembled together by the plurality of the screws 14 and the nozzle tip 15, therefore, the assembly and disassembly of the slide block assembly are troublesome and time consuming.

Second, the slide block 11 and the end caps 12 are provided with threaded holes for accommodation of the nozzle tip 15. In this case, the end cap mould of this conventional linear guideway needs to be defined with threads, and the slide block mould also should be provided with threaded holes. Obviously, the production cost will be increased.

To overcome the aforementioned defects of the conventional linear guideway, the present invention provides an improved linear guideway with quick release connector.

SUMMARY OF THE INVENTION

The primary objective of the present invention is to provide a quick release coupling device for a linear linearway that includes a plurality of connectors each having an threaded end screwed on the slide block, and then the abutment surface of the ends caps is rotated along the rotary abutment surface of the connectors, producing a locking effect. With the connectors, the slide block assembly can be assembled more quickly and easily, and besides having screwing and positioning function, the connectors also can be used as an oil nozzle.

The secondary objective of the present invention is to provide a quick release coupling device for a linear linearway, an end of the connectors is fixed on the slide block, and the rotary slant abutment surface having a height difference (which is conical, helical or curved rotary surface, for example) of the end caps is rotated relative to the abutment surface of the connectors, to a predetermined extent (rotated from its lowest portion to its highest portion). The rotation of the rotary abutment surface will cause a height difference that makes the rotary abutment surface of the end caps press firmly against the abutment surface of the wing-shaped portion of the connectors. By using the connectors, a plurality of screws and threaded holes for assembling the end caps to the slide block can be saved, thus substantially reducing the assembly time.

The further objective of the present invention is to provide a quick release coupling device for a linear guideway, wherein the connectors can be used as a substitute of many screws of the conventional slide block assembly, therefore, the end cap mould needn't to be provided with threads, and thus substantially reducing the production cost.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 3:
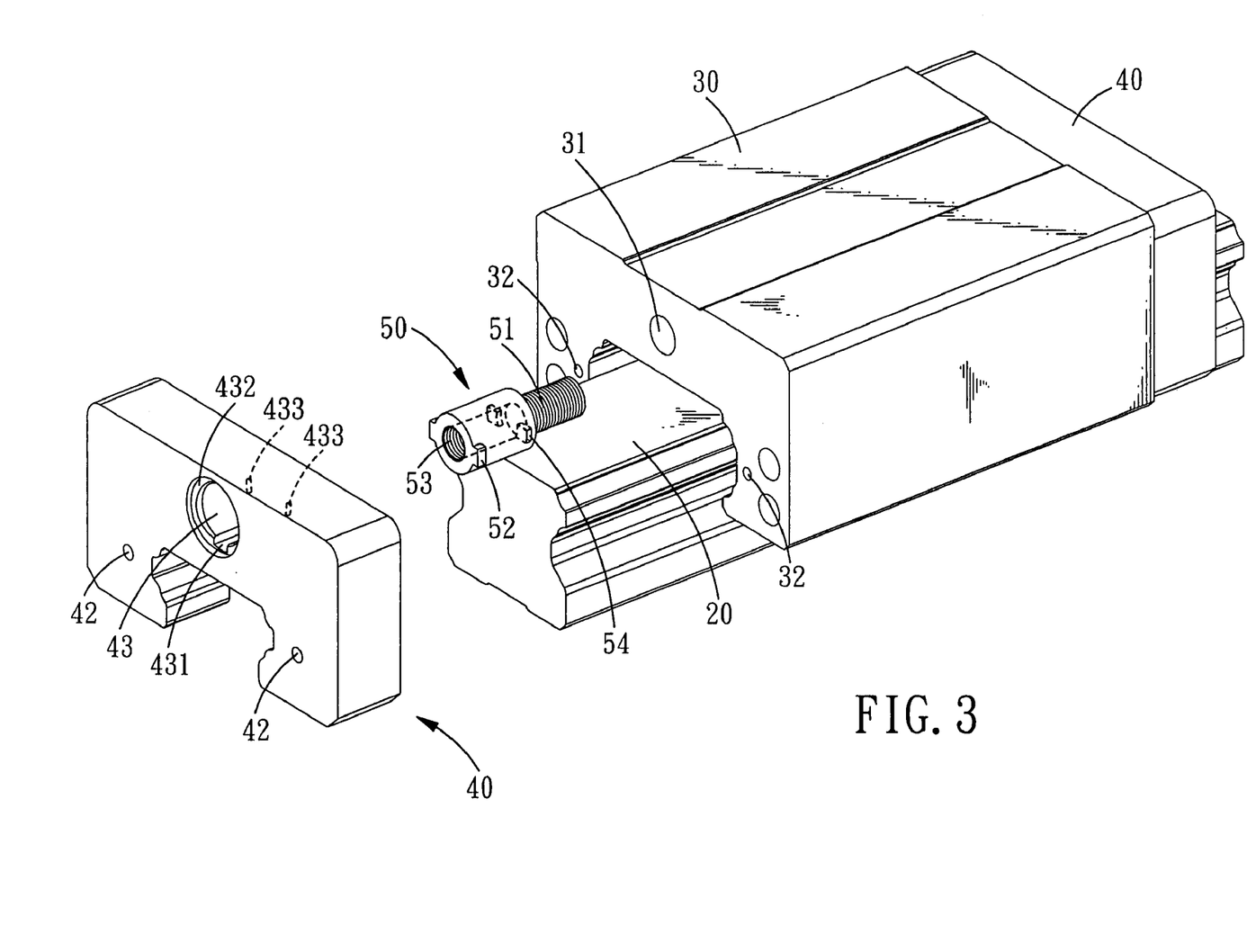
FIG. 3 is an exploded view of a linear guideway with quick release coupling device in accordance with a first embodiment of the present invention.

Referring to FIG. 3, a quick release coupling device for a linear guideway in accordance with a first embodiment of the present invention comprises a rail 20, a slide block 30, a pair of end caps 40 and a pair of connectors 50.

The slide block 30 is moveably mounted on the rail 20, and at either end of the slide block 30 is defined a positioning hole 31 and a plurality of threaded holes 32, extending in the axial direction of the rail 20.

Figure 4:
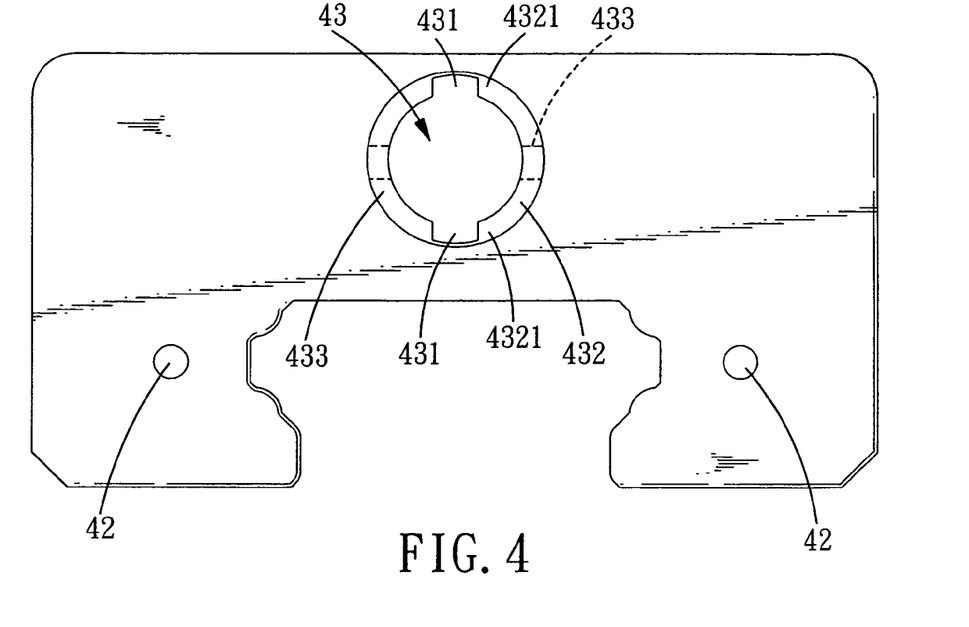
FIG. 4 is a cross sectional. view of an end cap of the linear guideway in accordance with the present invention.
Figure 5:
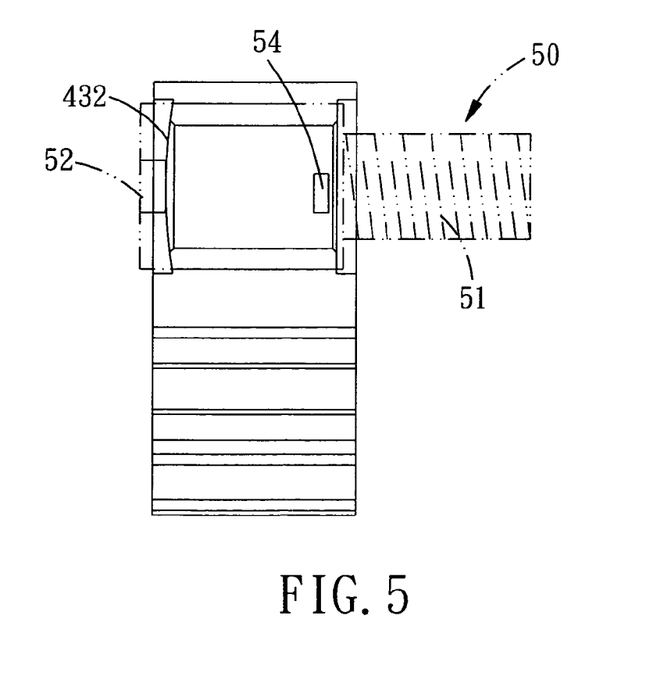
FIG. 5 is an illustrative view of showing the abutment surface of the end cap and the connector in accordance with the present invention.
Figure 6A:
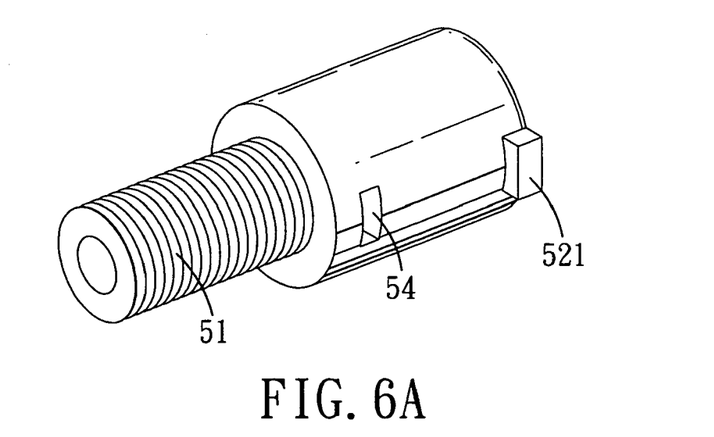
FIG. 6*a* is a stereographic view of the connector in accordance with a first embodiment of the present invention.
Figure 6B:
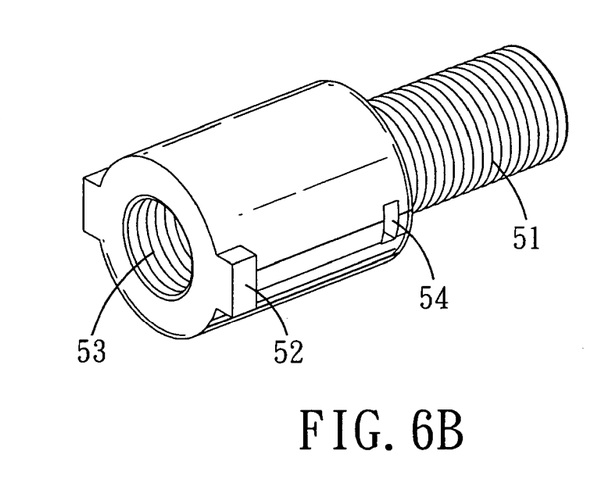
FIG. 6*b* is another stereographic view of the connector in accordance with a first embodiment of the present invention.
Figure 6C:
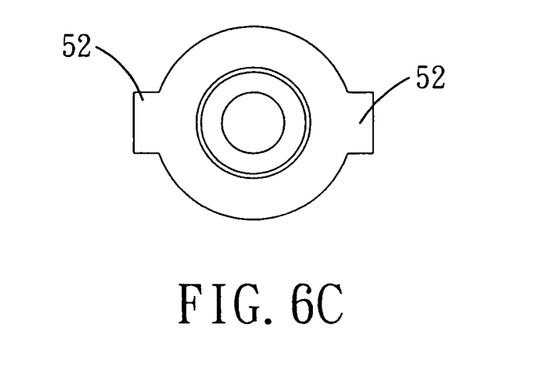
FIG. 6*c* is a cross sectional view of the connector in accordance with the first embodiment of the present invention.
Figure 7:
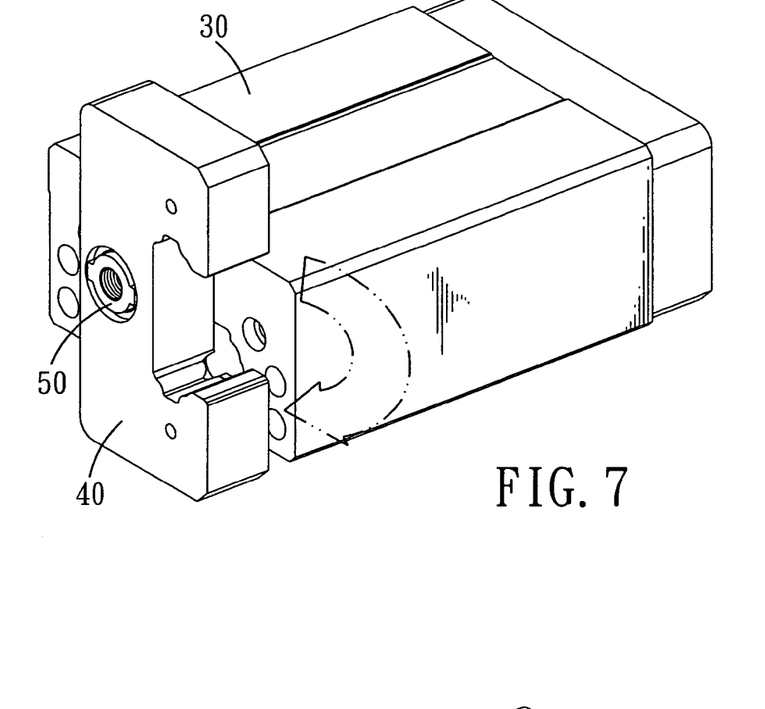
FIG. 7 shows that the end cap in accordance with the first embodiment of the present invention is being rotated about the connector.
Figure 8:
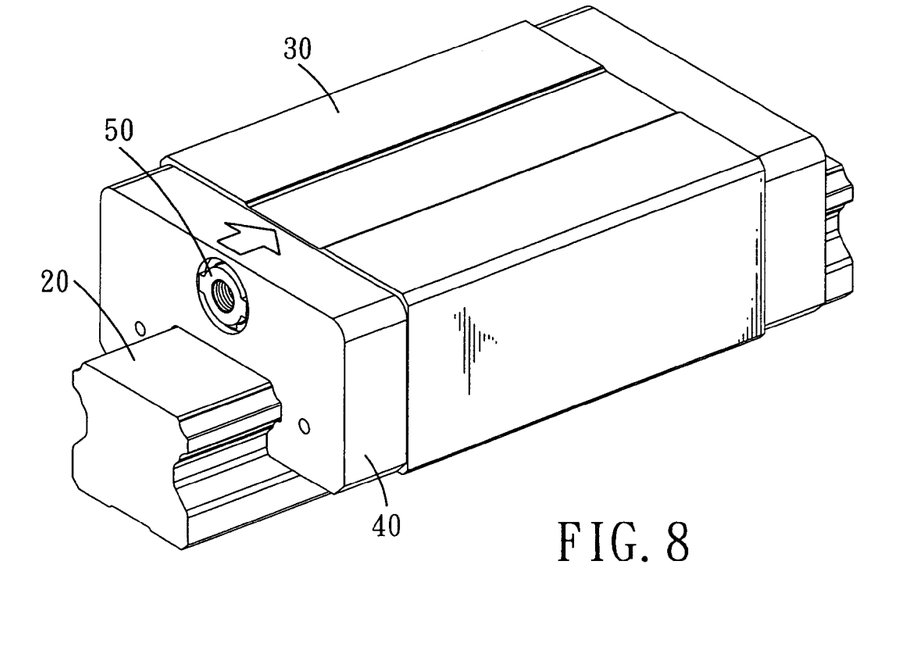
FIG. 8 shows that the end cap has been installed on the slide block.

The pair of end caps 40 is secured to either end of the slide block 30 and is defined with a through hole 43, at a side of the respective end caps 40 is arranged an oiling route, and at either side of the respective end caps 40 are formed a plurality of threaded holes 42. In the through hole 43 are annularly arranged a slant and rotary abutment surface 432 with a height difference and a plurality of grooves 431. The abutment surface 432 can be a slant curve structure, a slant conical structure or a helical structure. A lower portion 4321 of the rotary abutment surface 432 is located adjacent to the grooves 431. The through hole 43 and the threaded holes 42 of the end caps 40 are aligned with the positioning hole 31 and the threaded holes 32 of the slide block 30, and in the through hole 43 of the end caps 40 is defined oiling outlets 433 that are in communication with the oiling route inside the end caps 40.

The two connectors 50 are employed to assemble the end caps 40 to the slide block 30 and each has a threaded end 51, and another end of the respective connectors 50 is defined with a wing-shaped portion 52. The wing-shaped portion 52 has an abutment surface 521 for mating with the rotary abutment surface 432 of the end caps 40. In addition, each of the connectors 50 is defined with a threaded axial hole 53 and a plurality of radial apertures 54.

For a better understanding of the present invention, its operation and function, references should be made to FIGS. 3-9.

In assembly, the threaded end 51 of the respective connectors 50 is screwed in the positioning hole 31 of the slide block 30 initially, and then the end caps 40 are mounted on the connectors 50 by moving the grooves 431 of the through hole 43 along the wing-shaped portion 52 of the connectors 50 until the abutment surface 521 of the wing-shaped portion 52 of the connectors 50 slidably abuts against the rotary abutment surface 432 of the end caps 40, and then rotating the rotary abutment surface 432 of the end caps 40 to a predetermined extent. The rotation of the rotary abutment surface 432 will cause a height difference that makes the rotary abutment surface 432 of the end caps 40 press firmly against the abutment surface 521 of the wing-shaped portion 52 of the connectors 50. With the connectors 50, the slide block assembly can be assembled more quickly and easily, and besides having screwing and positioning function, the connectors 50 also can be used as an oil nozzle.

Figure 9:
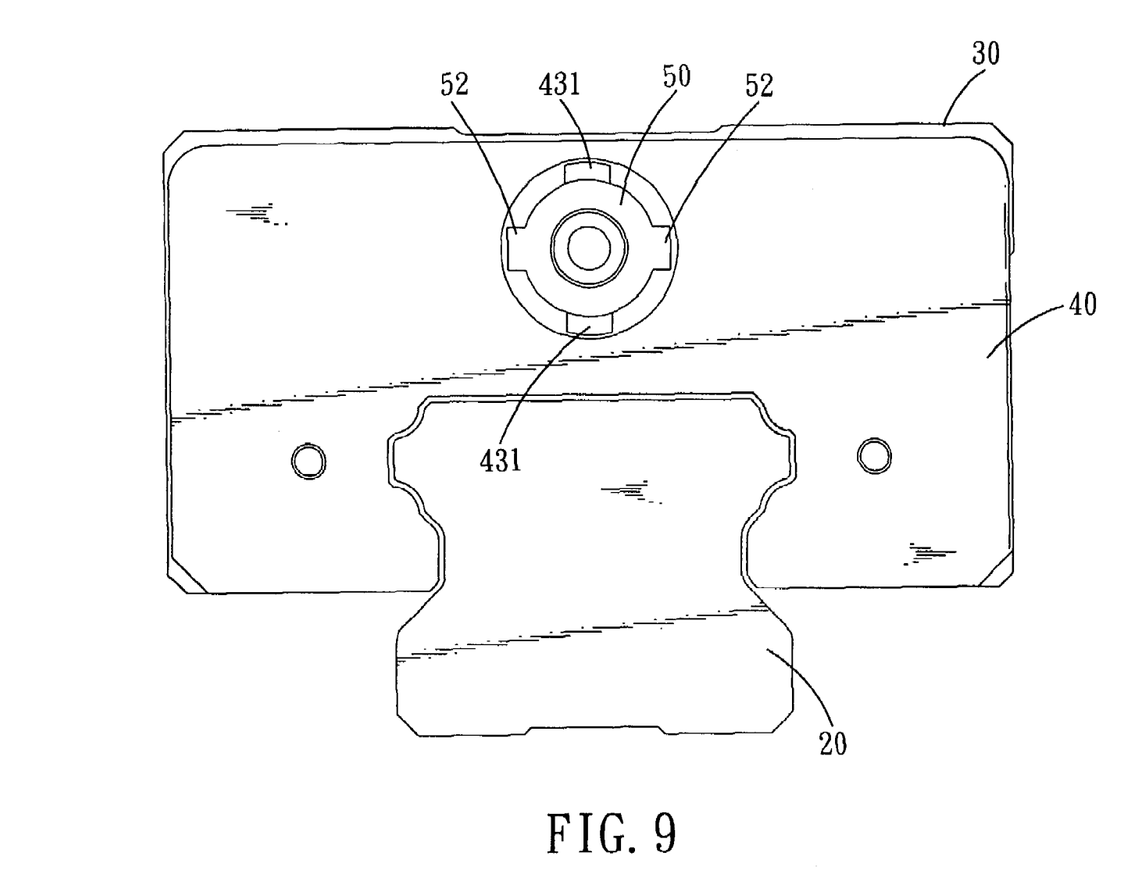
FIG. 9 is a cross sectional view of the linear guideway in accordance with the present invention.

It is to be noted that after the end caps 40 are assembled with the connectors 50, the radial apertures 54 of the connectors 50, the oiling route and the oiling outlet 433 of the end caps 40 will be in communication with one another, for passage of lubricating oil. In addition, by using the connectors 50, a plurality of screws and threaded holes for assembling the end caps to the slide block can be saved, and the end cap mould needn't to be provided with threads, thus substantially reducing the assembly time while saving the production cost.

Figure 10A:
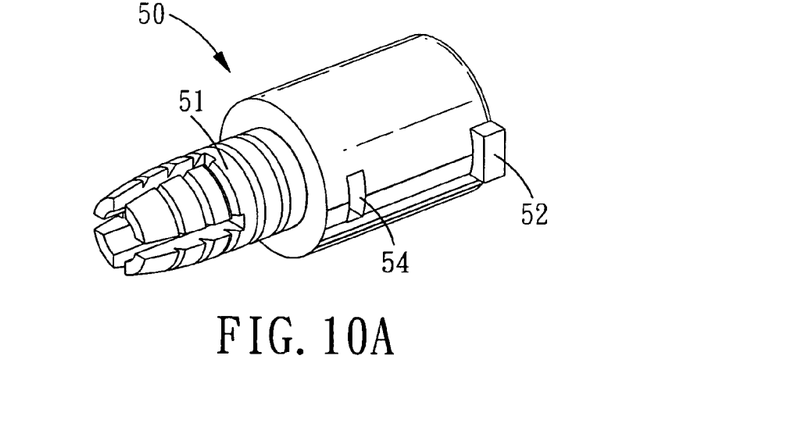
FIG. 10*a* is a stereographic view of the connector in accordance with a second embodiment of the present invention.
Figure 10B:
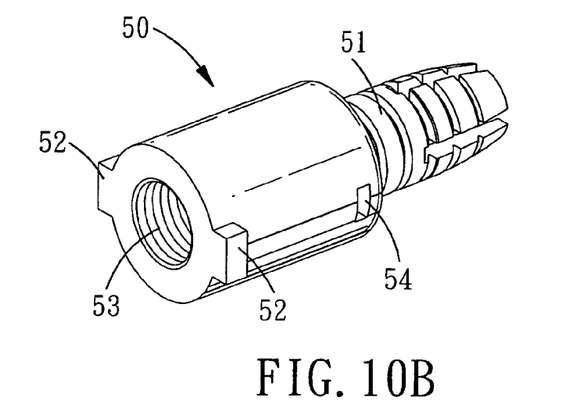
FIG. 10*b* is a stereographic view of the connector in accordance with a second embodiment of the present invention.

Referring to FIG. 10, a linear guideway with a quick release coupling device in accordance with a second embodiment of the present invention is similar to that of the first embodiment, except that the threaded end 51 of the connectors 50 is designed to have elasticity.

Figure 11:
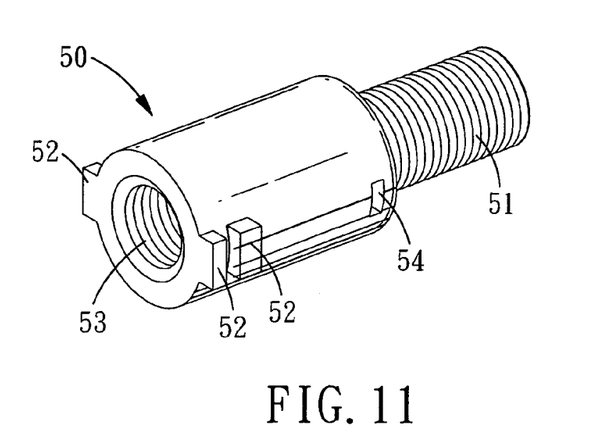
FIG. 11 is a stereographic view of the connector in accordance with a third embodiment of the present invention.
Figure 12:
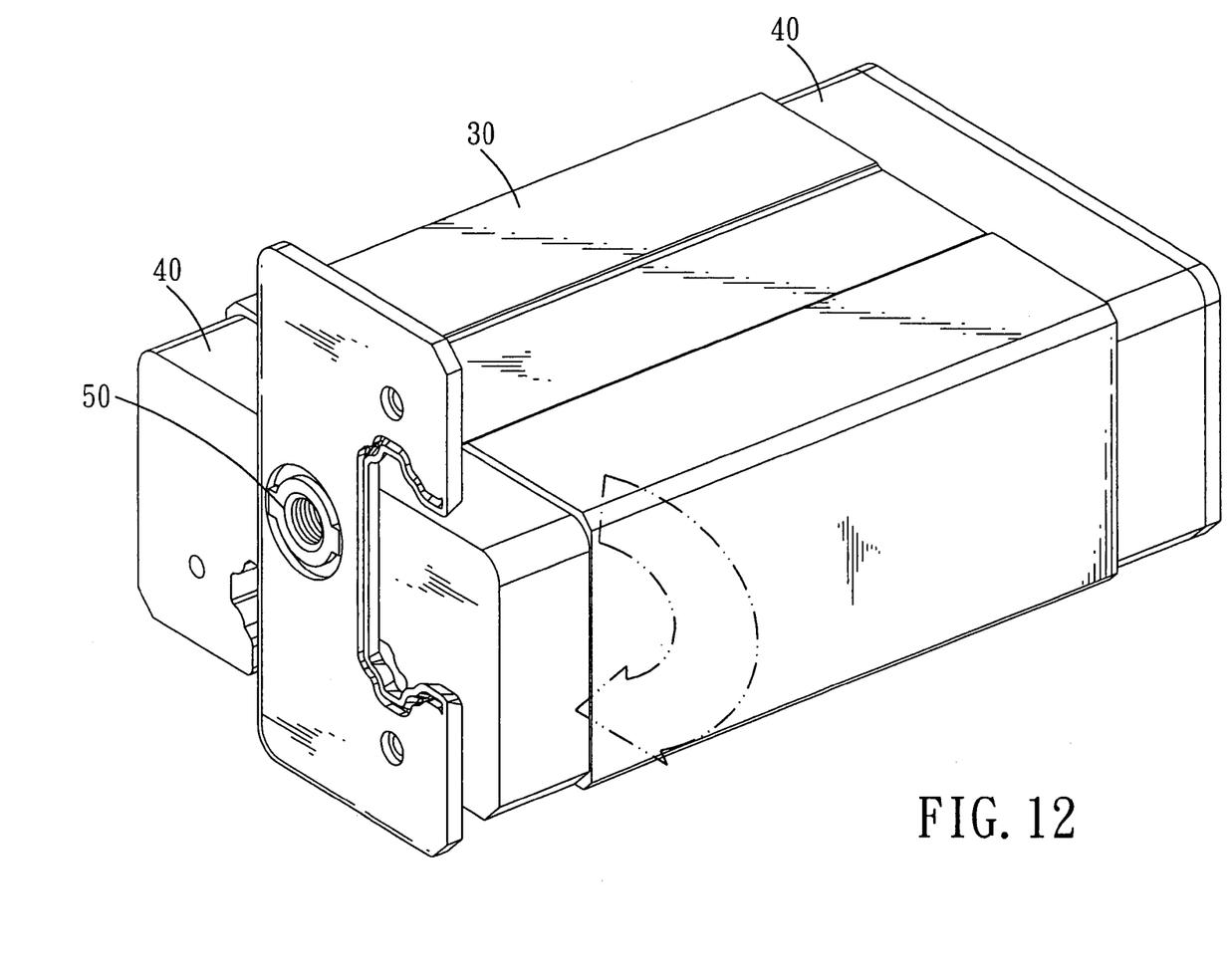
FIG. 12 shows that the end cap in accordance with the first embodiment of the present invention is being rotated about the connector.

Referring to FIGS. 11 and 12, a linear guideway with a quick release coupling device in accordance with a third embodiment of the present invention is shown and which is similar to that of the first embodiment, except that each of the connectors 50 is additionally provided with a wing-shaped portion 52 that is used to hold other accessories (such as scrapers or sealing membersz).

While we have shown and described various embodiments in accordance with the present invention, it should be clear to those skilled in the art that further embodiments may be made without departing from the scope of the present invention.

What is claimed is:

1. A quick release coupling device for a linear guideway comprising a rail, a slide block, a pair of end caps and a pair of connectors; and wherein each of the pair of end caps is secured to either end of the slide block and is defined with a through hole, in the through hole are annularly arranged a slant and rotary abutment surface having a height difference and a plurality of grooves, a lower portion of the rotary abutment surface is located adjacent to the grooves;

the pair of connectors are employed to assemble the end caps to the slide block and has an end fixed to the slide block, and another end of the respective connectors is defined with a wing-shaped portion, the wing-shaped portion has an abutment surface for mating with the rotary abutment surface of the end caps, the end caps are mounted on the connectors by moving the groove of the through hole of the connectors along the wing-shaped portion of the connectors until the abutment surface of the wing-shaped portion of the connectors slidably abuts against the rotary abutment surface of the end caps, and then rotating the rotary abutment surface of the end caps to a predetermined extent, a rotation of the rotary abutment surface of the end caps will cause a height difference that makes the rotary abutment surface of the end caps press firmly against the abutment surface of the wing-shaped portion of the connectors;

the slide block is moveably mounted on the rail, and at either end of the slide block is defined a positioning hole and a plurality of threaded holes extending in an axial direction of the rail;

an oiling route is defined at a side of the respective end caps, and at either side of the respective end caps are formed a plurality of threaded holes;

and each of the connectors, besides having screwing and positioning function, is also used as an oil nozzle;

a plurality of oiling outlets are defined in the through hole of the end caps and are in communication with the oiling route of the end caps.

2. The quick release coupling device for a linear guideway as claimed in claim 1, wherein the rotary abutment surface of the end caps is a slant curve structure.

3. The quick release coupling device for a linear guideway as claimed in claim 1, wherein the rotary abutment surface of the end caps is a slant conical structure.

4. The quick release coupling device for a linear guideway as claimed in claim 1, wherein the rotary abutment surface of the end caps is a slant helical structure.

5. The quick release coupling device for a linear guideway as claimed in claim 1, wherein the through hole and the threaded holes of the end caps are aligned with the positioning hole and the threaded holes of the slide block.

6. The quick release coupling device for a linear guideway as claimed in claim 1, wherein each of the connectors is defined with a threaded axial hole and a plurality of radial apertures.

* * * * *